(12) United States Patent
Anderson et al.

(10) Patent No.: US 9,394,193 B2
(45) Date of Patent: Jul. 19, 2016

(54) ACTIVE EDGE ROLL CONTROL IN A GLASS DRAWING PROCESS

(71) Applicant: Corning Incorporated, Corning, NY (US)

(72) Inventors: James Gary Anderson, Dundee, NY (US); Lewis Kirk Klingensmith, Corning, NY (US); James Paul Peris, Horseheads, NY (US); David John Ulrich, Burdett, NY (US)

(73) Assignee: CORNING INCORPORATED, Corning, NY (US)

( * ) Notice: Subject to any disclaimer, the term of this patent is extended or adjusted under 35 U.S.C. 154(b) by 202 days.

(21) Appl. No.: 13/963,176

(22) Filed: Aug. 9, 2013

(65) Prior Publication Data

US 2013/0340481 A1    Dec. 26, 2013

Related U.S. Application Data

(62) Division of application No. 12/984,124, filed on Jan. 4, 2011, now Pat. No. 8,528,364.

(60) Provisional application No. 61/293,364, filed on Jan. 8, 2010.

(51) Int. Cl.
*C03B 17/06* (2006.01)

(52) U.S. Cl.
CPC .................... *C03B 17/068* (2013.01)

(58) Field of Classification Search
None
See application file for complete search history.

(56) References Cited

U.S. PATENT DOCUMENTS

| | | | |
|---|---|---|---|
| 1,586,618 A | 6/1926 | Ferngren | |
| 1,697,104 A | 1/1929 | Byrnes | |
| 3,661,548 A | 5/1972 | Ito et al. | |
| 4,441,390 A * | 4/1984 | Hechler | B41F 13/60 101/227 |
| 6,094,942 A | 8/2000 | Falleroni et al. | 65/99.2 |
| 6,502,423 B1 * | 1/2003 | Ostendarp et al. | 65/29.14 |
| 6,758,065 B1 | 7/2004 | Gerber | |
| 6,896,646 B2 | 5/2005 | Kaiser et al. | 492/40 |
| 7,122,242 B2 | 10/2006 | DiGiampaolo et al. | 428/156 |
| 7,430,880 B2 | 10/2008 | Butts et al. | 65/253 |
| 8,146,388 B2 | 4/2012 | Anderson et al. | |
| 2005/0268655 A1 | 12/2005 | Butts et al. | |
| 2007/0062219 A1 * | 3/2007 | Blevins et al. | 65/91 |
| 2009/0107182 A1 | 4/2009 | Anderson et al. | 65/90 |

(Continued)

FOREIGN PATENT DOCUMENTS

| | | |
|---|---|---|
| EP | 1 340 721 | 9/2003 |
| EP | 1 721 872 | 11/2006 |
| WO | 2009/058293 | 5/2009 |

OTHER PUBLICATIONS

Japanese Office Action dated Jan. 6, 2015 relating to JP Patent Application No. 2013-266553; pp. 1-2.

(Continued)

*Primary Examiner* — Lisa Herring
(74) *Attorney, Agent, or Firm* — Kevin M. Able (57) ABSTRACT

An apparatus for drawing a glass ribbon including an edge roll assembly that contacts the glass ribbon with a force that is dynamically altered by an actuator electrically coupled to a sensor that measures the force applied against the ribbon. Dynamic, or real-time, variation of the edge roll force minimizes stress variability in the glass ribbon and improves ribbon shape control.

16 Claims, 9 Drawing Sheets

(56) References Cited

U.S. PATENT DOCUMENTS

2010/0300214 A1 12/2010 Cady et al. .................. 73/862.49
2011/0100056 A1* 5/2011 Anderson ............. C03B 17/067
65/90

OTHER PUBLICATIONS

Altmann, "Practical Process Control for Engineers and Technicians", pp. 1-17, copyright 2005.

* cited by examiner

ACTIVE EDGE ROLL CONTROL IN A GLASS DRAWING PROCESS

CLAIMING BENEFIT OF PRIOR FILED U.S. APPLICATION

This application is a divisional of U.S. application Ser. No. 12/984,124 filed on Jan. 4, 2011, which application claims the benefit of priority to U.S. Provisional Application Ser. No. 61/293,364, filed on Jan. 8, 2010. The content of this document and the entire disclosure of publications, patents, and patent documents mentioned herein are incorporated by reference in their entirety.

TECHNICAL FIELD

This invention is directed to an apparatus and method of controlling the stress in glass ribbon produced by a glass drawing operation by actively altering the force exerted against the glass ribbon by edge rolls that contact the ribbon.

BACKGROUND

One method of forming a thin sheet of glass is by a drawing process where a ribbon of glass is drawn from a reservoir of molten glass. This may be accomplished, for example, via an up-draw process, where the ribbon is drawn upward from the reservoir (e.g. Foucault or Colburn), or by a down-draw process (e.g. slot or fusion), where the ribbon is drawn downward, typically from a forming body. Once the ribbon is formed, individual sheets of glass are cut from the ribbon.

In a conventional downdraw process, such as a fusion downdraw process, the molten glass is formed into a glass ribbon contained within a draw chamber defined by a shroud that surrounds the ribbon. Among other things the shroud serves to maintain a consistent thermal environment in the region defined by the shroud and surrounding the ribbon. Roller pairs penetrate the shroud and pinch the ribbon edges. The rollers (or rolls) may be used to apply a pulling force to the ribbon, to apply a transverse tension to the ribbon, or merely to guide the ribbon. Accordingly, a rotational force may be applied to the rolls by a motor, or the rolls may be freewheeling and the rotational force applied to the rollers by the descending ribbon. In either case, the rolls rotate. Production roll mechanisms typically allow for the rolls to move horizontally and/or vertically from the glass contact area. This accommodates geometric tolerances of the rolls, run out and tolerance changes in operation, along with normal variability in glass thickness. Further, production roll mechanisms typically allow the rolls to move far away from the glass for maintenance access, process restart, and other practical considerations. However, the rolls must also accommodate thickness changes at the edges of the ribbon, or dimensional variations in the edge rollers themselves. Frictional forces that resist the free motion of the edge rolls traverse to the ribbon during production operation may induce force cycling that manifests as undesirable perturbations or stress changes in the ribbon that can become frozen into the glass as the glass transitions from a viscous material to an elastic material.

SUMMARY

Improvements in roll drive systems for downdraw glass manufacturing systems enable significantly improved attributes, longer process life—and will be especially beneficial draw where the glass ribbon produced by the process is less stiff—meaning wider platforms, and thinner and taller ribbons. The ability to prescribe the tension forces in the visco-elastic area of the ribbon, reducing the cycling of these forces can facilitate significant benefit to ribbon attributes, especially warp and stress in the ribbon.

One issue to be addressed is that current roll systems define a pinch force—that pressures the rolls together—and causes them to generate a cross-draw (across the ribbon) tension (or compression) effect. This pinch force can vary with equipment setup due to a variety of frictional mechanical issues—and can vary with roll wear or due to the thermal environment changes or with jamming of the equipment by foreign particles (e.g. glass particles) in the environment.

A pinch force shift causes the cross-draw tension produced by the rolls to change. A consistent roll tension is important to shape and stresses in the ribbon, and the separate glass sheets or panes later separated from the ribbon.

Another issue is that the current roll systems show a cycling of forces that occurs over the rotation of the roll pairs. This rotational variability manifests as a cycling of tension force and pulling forces (when the rolls are driven). In addition, this roll pair cycling interacts between the various roll pairs. Effects from this force cycling are imprinted into the glass—resulting in warp and stress variation—and also contribute to process stability. For example, changes in force can cause the ribbon shape to 'pop'. That is, to instantly change.

The dominant source of the roll force cycling occurs from mechanical run out between the roll pairs at opposite sides of the ribbon. This can be caused by the out-of-roundness of each roll, by the run out of the bearings, if the axles are not straight and parallel to each other or differences in the roll material compressibility or other properties over its circumference. Since the roll pairs have run out, the roll mounting mechanism must allow for the axles to move apart as the rolls rotate. Though attempts are made to minimize pinch force variation, this pinch force cycle, in turn, causes the cross-draw tension force and when driven, the pulling force, to vary in a cyclical pattern.

To avoid this cycling affect, one can either eliminate the roll run out (which has practical limits), eliminate friction in allowing the rolls to move, or to automatically counteract the frictional effect—by applying an offsetting force to counteract the cycling frictional forces Further, roll force cycling results from the variable pulling load as separate sheets are removed from the ribbon. The change in ribbon weight, for example, has a discernable impact on the roll forces. Also, force changes are observed as the sheet is cutoff from the separation process equipment. This is due to the forces imparted to separate the sheet, in addition to the force change simply from removing the sheet weight. These sheet cycle forces are different than the roll rotational effects described above. The sheet cycle forces interact with the roll systems and impact the product.

Thus, a means to precisely manipulate tension force levels from a sheet draw roll pair are described herein. This tension is important to product sheet shape and stresses. A manual or automated control scheme is can be used to tune roll tensions to optimal levels for product attributes. In the case of a roll that extends across the width of the ribbon, or in some other specific applications, tension may not be able to be directly measured. In this case, a method to measure and control the pinch force is disclosed as a suitable surrogate to roll tension manipulation.

The apparatus described herein can be used to eliminate sheet draw roll force cycling from geometric run out or material property variation using an automated system which automatically varies the applied pinch force to cancel out (or offset) the variability and maintain a constant cross-draw tension and/or constant pulling force. As an alternative, a pinch force sensor can be used. By actuation of the roll pair pinch force, or another method such as actuation of down tilt angle or contact angle, along with sensing of the roll tension, the consistency of tension can be dramatically improved—in essence giving a constant tension to the glass process.

Other means to adjust roll tension such as varying the roll down tilt angle or by varying the roll/ribbon contact angle (both in the case of cantilevered rolls) for this invention are practical The methods described herein can result in improved flatness (lack of warp), and lower stress (from lack of product shape). This is especially important for ribbon draw processes where the glass ribbon lacks stiffness, either because a very thin ribbon is being produced, or if the ribbon is tall and/or wide, or if the process thermal conditions do not allow manipulation of the thermal profile (down and across the ribbon) to maintain high thermally induced tension. The apparatus and methods described herein can, for example, limit lateral (across a width of the ribbon) tension variation and/or the perpendicular (normal) pinch force exerted by the edge rolls against the ribbon due to such force cycling to less than 4.5 kg peak-to-peak variation, preferably less than 3.0 kg.

An automated control scheme can be constructed using known PiD approaches or anticipator control schemes that will eliminate variability from roll force cycling and variability of roll load coming from the separation and removal of the glass sheets.

Full-length edge rolls or cantilevered rolls can be used. However, in some implementations a sensor for measuring tension may not be practical. In this case, a pinch force (or normal force) sensor can be used for a control target.

A practical actuator can be made from a variety of options. A linear servomotor has been found to perform this function well, although a variety of other options are possible. A linear servo is used to provide a part or total of the roll pinch (or pressuring forces). In some embodiments the servo is added to counterweight linkages, which provide the pressuring function for the rolls.

A bleeding compressed air cylinder can also be used as an actuator, as well as linear motors. A design consideration is the overall force capability of the actuator, along with a fast response time if the actuator is used to counteract short-term variability.

The optimal roll force levels can be defined by experimentation or by offline modeling. It is believed that the most comprehensive means is to conduct experiments for roll forces to optimize the forces that give best product attributes for a particular production setup. Methods like DOE or Evolutionary Operations could be applied to define the optimal conditions for roll tensions. For cantilevered rolls it is believed the total tension of the roll pair, that is, the sum of right and left axle sensors, is the most important to product performance. However, the optimal tension for each roll pair should be determined independently.

More sophisticated optimization approaches can also be used, such as where the roll forces are optimized in concert with the thermal setup of the draw. Concurrent optimization strategies can be helpful in defining optimal roll tension force levels.

Once target tension levels are defined for each roll pair, the actuator and sensor system can be used to hold to optimal levels, thereby counteracting normal process drift of the forces.

Another approach is to compensate for short-term roll force variability resulting from the roll rotation and variable pulling load from the sheet removal process. This can be combined with the methodology above to hold the tension at an optimal target, or can be used to simply eliminate cycling forces.

Accordingly, in one embodiment, an apparatus for drawing a ribbon of an inorganic glass is disclosed comprising an edge roll assembly comprising a rotatable shaft and an edge roll coupled to the shaft that contacts an edge of the glass ribbon. The apparatus further comprises a sensor that detects a tension force or a pinch force and develops an electrical signal proportional to the tension force or pinch force, a controller that receives the sensor signal and develops a corrective signal and an actuator coupled to the edge roll shaft that receives the corrective signal from the controller and varies the tension force or the pinch force in response to the corrective signal. The apparatus may be configured to move the edge roll shaft in a horizontal plane or a vertical plane.

In some embodiments, at least a portion of the applied pinch force is a passive force. That is, a force that is not actively varied. Examples of passive forces are gravity (i.e. acting through dead weights) and springs. In comparison, an active force is a force that can be actively varied, such as a change in magnitude as a function of time. An example of an active force is a force that is applied by an actuator such as a motor, pneumatic or hydraulic piston, solenoid, and the like. In some embodiments, the total pinch force is supplied as an active force such as through an actuator. In other embodiments the total pinch force is the sum of a passive and an active pinch force.

In another embodiment, a method of making a glass ribbon is described comprising producing a glass ribbon in a down draw glass making process, the glass ribbon comprising a visco-elastic region, contacting the visco-elastic region of the glass ribbon with opposing rollers, the opposing rollers applying a pinch force and a tension force on the glass ribbon and sensing a magnitude of the pinch force or a magnitude of the tension force and producing a signal representative of the sensed magnitude of the pinch force or the tension force. The produced signal is compared with a predetermined set point, and a corrective signal is generated. The corrective signal may then be used to drive an actuator that varies the pinch force or the tension force applied to the glass ribbon by the opposing rollers so that the applied pinch force or tension force is substantially equal to the set point. The pinch force may comprise a passive force in addition to an active force.

In some embodiments the actuator translates a shaft of at least one of the opposing rollers in a direction perpendicular to a longitudinal axis of the shaft. In another embodiment the actuator rotates a shaft of at least one of the opposing rollers through an angle lying in a horizontal plane. The actuator may rotate a shaft of at least one of the opposing rollers through an angle lying in a vertical plane.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Drawing a thin ribbon of material to form a glass sheet having a thickness less than about a millimeter to the exacting standards of flatness required for modern display applications, such as televisions and computer monitors, requires careful control of all aspects of the manufacturing process. However, particular attention must be paid to the period of time during which the glass ribbon is transitioning from a visco-elastic state to a solid elastic state. Even small force variations on the ribbon, such as might be produced by air currents in the drawing area, or vibrations from running equipment, can manifest as perturbations in what should be a pristine, flat surface, and may induce residual stresses in the ribbon that are retained by the eventual sheet separated from the ribbon.

In an exemplary fusion-type downdraw process, molten glass is supplied to a forming body comprising a channel open at its top formed in an upper surface of the body. The molten glass overflows the walls of the channel and flows down converging outside surfaces of the forming body until the separate flows meet at the line along which the converging surfaces meet (i.e. the "root"). There, the separate flows join, or fuse, to become a single ribbon of glass that flows downward from the forming body. Various rollers (or "rolls") positioned along the edges of the ribbon serve to draw, or pull the ribbon downward and/or apply an outward tensioning force to the ribbon that helps maintain the width of the ribbon against an inward contraction. Some rolls may be rotated by motors, whereas other rolls are freewheeling.

As the ribbon descends from the forming body, the molten material cools and transitions from a viscous liquid state at the bottom of the forming body, to a visco-elastic state and finally to a solid elastic state. As used herein, the elastic state is generally considered to be when the glass material has reached a temperature below the glass transition temperature range. In some embodiments, the elastic state may be considered to be equivalent to a viscosity greater than $10^{13}$ poise. When the ribbon has cooled to an elastic state, the ribbon may be scored across its width, and separated along the score line to produce a separate glass sheet. In some embodiments separate glass sheets may be cut in a single pass, without the need for scoring.

During the time the ribbon is in a liquid viscous state, stresses imposed on the molten material are immediately relieved. However, as the ribbon cools and the viscosity increases, induced stresses are not so quickly relieved, until a temperature range is reached when induced stresses and shape will be retained by the glass. This occurs over the glass transition temperature range. Both are sources of undesirable residual stresses that can lead to warping of the final product. For example, residual stresses can be relieved by the ribbon (or separated sheet) by causing the ribbon or sheet to change shape. The stress can thereby become wholly or partially relieved, but at the expense of buckling in the sheet. On the other hand, attempts to flatten the ribbon or sheet, such as by forcing the ribbon or sheet flat, result in an induced stress in the glass. It is desirable, therefore, that during the period when stress and/or shape can be frozen into the glass that forces imposed onto the glass ribbon be as consistent (and small) as possible. One source of force variation comes from the edge rolls. Note that force variation from the edge rolls could also result in variability to the glass thickness, and other product attributes. Experience has shown that force consistency is most important in achieving ultra low stress and high flatness requirements, for example, of LCD substrate sheets.

Although edge rolls may take different forms, a typical edge roll subassembly comprises a pair of edge rolls that pinch or grip the ribbon edges. Consequently, pairs of edge rolls are positioned at opposite edges of the ribbon so that for a particular vertical location along the length of the ribbon (i.e. distance from the root), two pairs of edge rolls are used. Edge rolls may be driven, such as by electric or hydraulic motors, or edge rolls may be freewheeling. Edge rolls may be arranged to be substantially parallel and horizontal, or edge rolls may be tilted so that the rotational axis of a roll is non-horizontal. For example, some edge rolls may be tilted in a vertical plane, whereas other edge rolls may be tilted in a horizontal plane. Edge rolls at opposing edges of the glass ribbon but adjacent the same surface may share a common shaft so that the shaft extends at least across the width of the ribbon, or each edge roll may have its own, separate shaft that extends only so far as necessary to position the edge roll contact surface in an appropriate location to grip an enlarged portion of the ribbon—the bead—at the edge of the glass ribbon. The edge roll should contact the glass ribbon sufficiently to apply the desired force, but with the understanding that the further inward toward the center of the ribbon the roll contacts the sheet, the less pristine glass surface is available to produce pristine glass sheet. The edge roll is designed to withstand prolonged high temperatures, sometimes in excess of 800° C., arising from contact with the glass ribbon, and preferably utilizes a ceramic material. For example, edge rolls can be formed by stacking a plurality of disk-shaped ceramic fiber forms to produce a cylindrical roll body. The cylindrical roll body can then be secured at the end of an edge roll shaft.

Each pair of edge rolls is designed to accommodate a varying gap between the contact surfaces of the opposing rolls. For example, each edge roll may not be perfectly concentric with the shaft to which it is attached, creating run out as the rolls rotate. As used herein, run out refers to the radial position of the surface of the roll that contact the glass ribbon as the roll rotates about an axis of rotation, generally considered the rotational axis of the shaft to which the roll is coupled. If the roll surface (the surface of the cylindrical body) is not exactly concentric about the shaft axis of rotation, the distance between a point on the roll contact surface at a given location, for example, at an arbitrary angular location, will vary as the contact surface rotates with the shaft. This may occur, for example, if the cylindrical body is in fact not perfectly cylindrical, or if the shaft is not centered at the center of the cylindrical roll body. Further, machining tolerances to shaft straightness, and warp at operating temperature, contribute to such operational run-out. In addition, the edge rolls are designed to accommodate small fluctuations in the thickness of the ribbon edges by either pivoting or sliding against a counter force (counterweight). This movement of the edge rolls may occur as the ribbon descends between the edge roll pairs. In other words, the edge roll pairs must be able to separate, and then draw closer together again as the rolls operate, either to accommodate the aforementioned shortcomings of the rolls themselves, and/or thickness variations of the ribbon.

Preferably, the edge rolls are biased inward, toward the plane of the glass ribbon, by a biasing force. The biasing force is small enough to accommodate outward movement (widening of the gap between the edge roll pair) from a given starting position that may be caused by the glass ribbon for example, but strong enough to move the roll assembly back toward the starting position when the force causing the outward movement is removed. For example, the edge rolls may include attached members (e.g. levers) arranged to pivot about a pivot point and allow the edge roll shaft position (and the roll surface in contact with the ribbon) to accommodate the fluctuation in roll shape or ribbon thickness. Counterweights may be used to apply sufficient force to the lever so the edge roll contact surfaces can grip the glass ribbon, yet still allow the rolls to move outwardly in relation to the ribbon plane in response to a varying roll eccentricity for example. However, other methods of applying a biasing force can be used, such as springs arranged to either pull or push the roll assembly along a predetermined path. An inherent issue with production roll systems used in the commercial production of glass is that friction within the roll mechanism slides and bearings—along with friction within the seal plates that seal the opening through which the edge roll shaft traverses the enclosure enclosing the ribbon—resists the lateral (off-axis) motion of the shaft and imparts an undesired variable force that alters the actually pinch force applied to the glass by the opposing rolls. Precise measurements of forces experienced by the rolls in a direction perpendicular to the direction of travel of the ribbon, for example, have shown a force variability of over 4.5 kg over a single roll rotation. Vertical pulling forces exerted on the ribbon can be similarly affected, and similar measurements have shown large variation in the pulling force applied to the ribbon.

Summarizing, as the ribbon descends from the forming body, small fluctuations in ribbon edge (bead) thickness, or for example eccentricity of the edge roll, causes movement of the edge roll in a direction transverse to the plane of the glass ribbon (perpendicular to the direction of travel of the ribbon). A biasing force can be used to maintain contact between the roll contact surface and the glass ribbon edge, but this biasing force has traditionally been "dumb" in the sense that the biasing force has been supplied by a counterweight of a given but static magnitude, or by a spring or springs with a given spring constant. Ideally, the edge rolls should be free to react to variations in the system variations (e.g. ribbon thickness changes, non-concentric rolls shaft surfaces, or other imperfections that cause run out in the rotation of the rolls) without opposition. However, friction in the system opposes these accommodating motions. In the extreme, such as if the pulling roll pair was frozen in place and capable only of rotation of the roll contact surface (that is the opposing friction was infinite in magnitude), changes in the system would be acutely felt by the ribbon. For example, if one or both edge rolls of an edge roll pair were not concentric with their respective shafts, each revolution of a roll would apply a cyclic force against the ribbon, in effect driving the roll into the ribbon. This cyclic force has a direct impact on the stress in the ribbon that varies with time.

To overcome the deficiencies noted above, an edge roll assembly is described below that actively monitors tension at the edge roll shaft, and uses the measured tension as a feedback signal to modify the pinch force exerted on the ribbon by an edge roll pair, thereby maintaining a constant pinch force. In other embodiments, the pinch force may be actively varied in response to feedback from other process variables. Alternatively, the actual pinch force may be monitored and used as a feedback signal. While monitoring the pinch force is more direct, it is also more difficult to implement as a practical matter. Nevertheless, pinch force monitoring may be used, for example, in the case when an edge roll shaft extends across the ribbon and couples to an opposing edge roll. These and other aspects are described in more detail below.

Figures 1A, 1B:
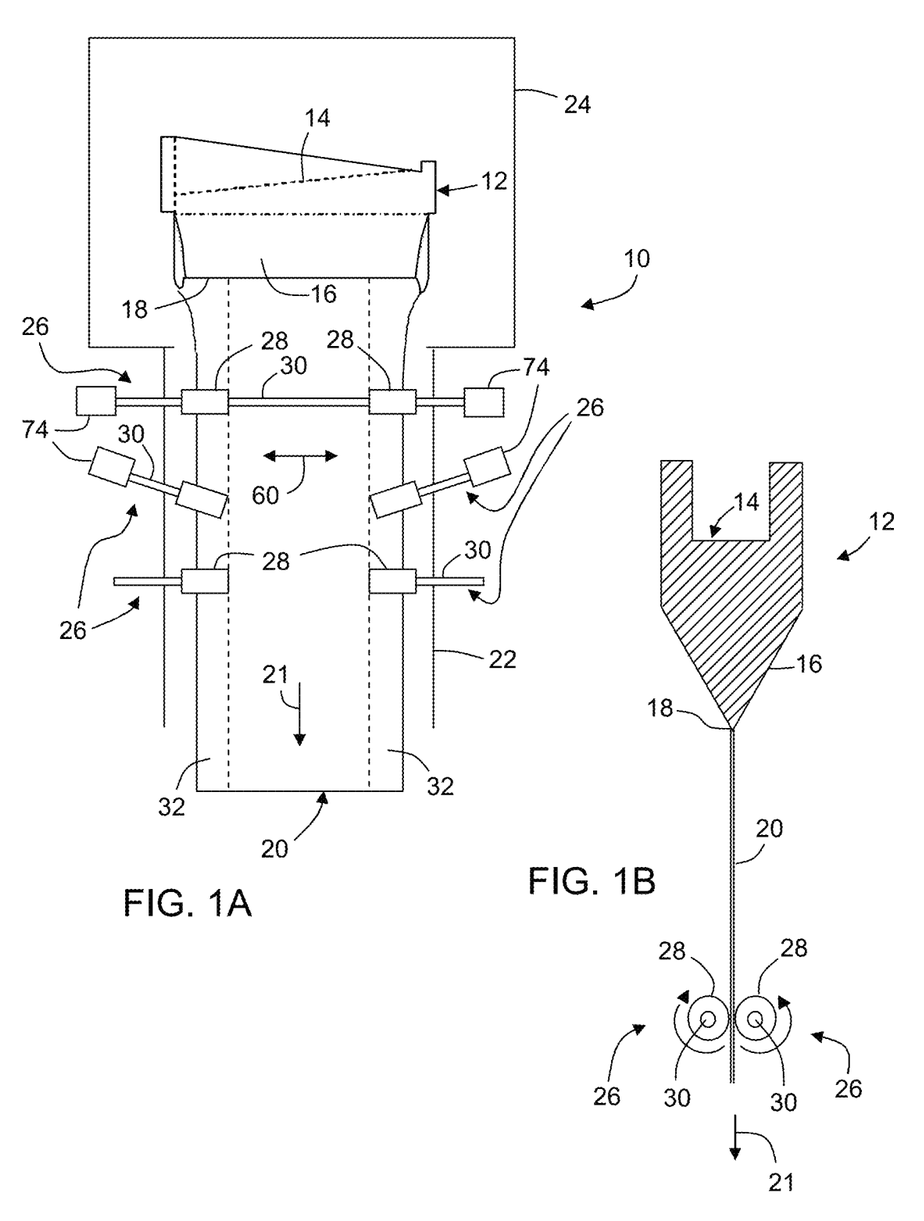
FIG. 1A is a front elevation view of an exemplary fusion downdraw process according to an embodiment of the present invention.
FIG. 1B is an edge view of a portion of a glass ribbon formed via a downdraw process, wherein an edge of the ribbon is engaged between a pair of opposing edge rolls.

Shown in FIG. 1A is an exemplary fusion downdraw apparatus 10 comprising forming body 12 including channel or trough 14 and converging forming surfaces 16. Converging forming surfaces 16 meet at root 18, which forms a substantially horizontal draw line from which the molten glass is drawn. By substantially horizontal what is meant is that the forming body may in some cases be tilted longitudinally (end-to-end) or sideways to adjust the flow of molten glass over the top edges of the trough, but such tilting is generally slight, and may vary by only one or two degrees or. Trough 14 is supplied with molten glass from a source, such as a melting furnace and accompanying delivery piping (not shown), and the molten glass overflows the walls of the trough and descends over the converging forming surfaces of the forming body as separate streams. The separate streams of molten glass flowing over converging forming surfaces 16 meet at root 18 and join each other to form glass ribbon 20. Glass ribbon 20 is drawn downward in direction 21 from root 18 and cools as it descends from the root, transitioning from a viscous molten material to an elastic solid.

When glass ribbon 20 has reached a final thickness and viscosity in an elastic region of the ribbon, the ribbon is fully separated across its width to provide an independent glass sheet or pane. As molten glass continues to be supplied to the forming body, and the ribbon lengthens, additional glass sheets are similarly separated from the ribbon.

Lower enclosure 22 surrounds and encloses the upper reaches of ribbon 20 below root 18 and connects with an upper enclosure 24 that houses forming body 12. Lower enclosure 22 protects the ribbon from environmental influences (e.g. drafts, dust, etc.) and serves as a platform on which various heating and/or cooling equipment may be positioned to regulate the temperature of the ribbon as it travels downward. Other equipment, including the edge roll assemblies, may be mounted on, or interact with lower enclosure 22.

Edge roll assemblies 26 are positioned at predetermined vertical locations below root 18. Each edge roll assembly includes an edge roll 28 and an edge roll shaft 30. Edge roll assemblies 26 may include driven edge rolls used to apply a pulling force and/or tensioning force to the ribbon and/or non-driven idler edge rolls that guide the ribbon and may further help maintain a tension across the ribbon width. As described above, edge rolls positioned on one side of the ribbon may share a common shaft across the width of the ribbon, or each edge roll may have its own shaft. Edge rolls are typically arranged in pairs, where each edge roll 28 of an edge roll pair is positioned on opposite sides of a given edge of the ribbon from the other edge roll so the ribbon can be pinched between the opposing rolls of the roll pair as illustrated in FIG. 1B. In some embodiments, one edge roll of a pair of opposing edge rolls is stationary, while the other edge roll is free to move away and toward the ribbon. That is, the stationary edge roll is free to rotate, but it does not change position away from or toward the ribbon. Additionally, edge roll pairs are themselves arranged in pairs, one pair of rolls per ribbon edge at a given vertical position.

Each edge roll assembly 26 includes support structures, bearings, and means of applying a driving force, if needed. Edge roll assemblies 26, including their operative structures, are subject to typical manufacturing tolerances. For example, edge rolls that contact ribbon edge portions 32 may not be exactly concentric with a respective shaft 30. Or, an edge roll may be out of round (e.g. include a local flatness or have an elliptical shape). Or an edge roll shaft may be not perfectly straight. These factors may lead to a periodic lateral displacement of an edge roll, and, like an out-of-round tire, may result in a periodic disturbance in the ribbon each time the roll completes a revolution. This disturbance can manifest as a change in stress that can become frozen into the ribbon. In addition, the ribbon edges (or "beads") are slightly bulbous, and their thickness may vary along the length of the ribbon. In other words, the edge rolls of an edge roll pair should be configured to accommodate a varying gap between them.

Ideally, an edge roll assembly 26 is designed to accommodate the operating movement of the edge rolls 28 and yet maintain a consistent pinch force on the glass ribbon between the rolls of an edge roll pair. However, in reality, friction within seal plates that seal an edge roll shaft penetration through the lower enclosure and/or other operating mechanisms can cause the pinch force to vary. This variation in pinch force, in turn, may cause the horizontal and vertical components of the roll forces imparted onto the glass ribbon to vary cyclically. Roll force cycling can directly impact the resultant glass sheets, being manifest as stress or stress variability, warp or warp variability, or even as variation in the glass thickness.

Figure 2:
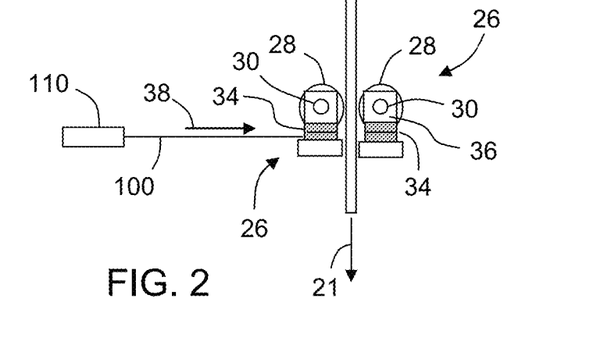
FIG. 2 is a cross sectional view showing a pair of edge roll assemblies engaged with a glass ribbon wherein a pinch force is applied by both a passive force and an active force.

Shown in FIG. 2 is a view of a portion of the apparatus of FIG. 1B seen looking toward one edge portion 32 of glass ribbon 20. A pair of opposed edge roll assemblies 26 are depicted, each edge roll assembly comprising an edge roll 28 coupled to edge roll support assembly 34 through an edge roll shaft 30 and housing 36. Edge roll assemblies 26 may be positioned such that their respective edge rolls 28 can contact ribbon 20 at any vertical location of the ribbon, including the viscous, visco-elastic or elastic portions, depending on the function of the edge roll. Edge rolls 28 are typically cylindrically shaped bodies coupled to the shaft. For example, stacking a plurality of ceramic discs into a suitable roll shaft 30 may form the cylindrical body.

A passive bias force, e.g. bias force 38 shown in FIG. 2, is applied against an edge roll support assembly 34 and, in combination with an opposing edge roll assembly, operates to pinch glass ribbon 20 between the edge rolls 28 with a predetermined pinch force. The passive bias force 38 may be, for example, a spring or deadweight coupled to the roll assembly. Both edge roll assemblies may be configured to move. However, as noted above, one edge roll assembly could also be stationary. Disturbances in the pinch force may result in movement of the edge rolls laterally outward in a direction generally transverse to the plane of the ribbon and against the passive bias force. To minimize frictional resistance to movement of the edge rolls bearings used in the assemblies can be low friction bearings such as air bearings.

Figure 3:
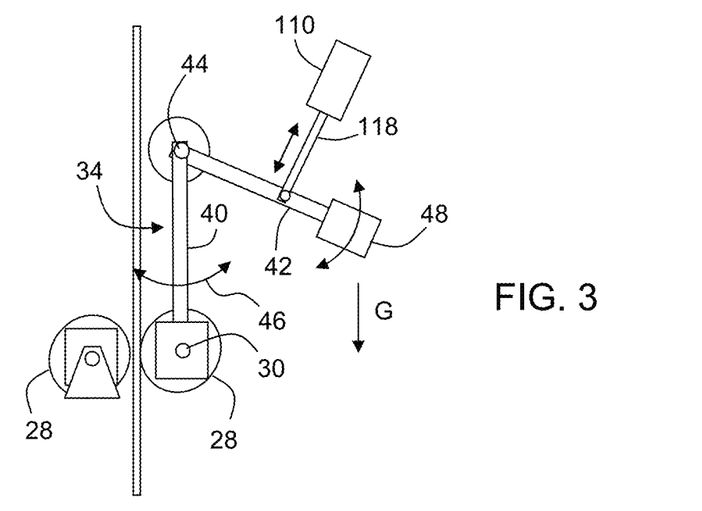
FIG. 3 is a side view relative to a glass ribbon wherein pinch force is applied through a rotary motion by both a passive force (dead weight via gravity G) and an active force (actuator).

While the embodiment of FIG. 2 illustrates an apparatus that relies upon translation of a pair of edge roll assemblies toward or away from the glass ribbon, it should be noted that movement of each edge roll support need not be simply translation. For example, each edge roll assembly may be configured to swing about an axis so that an edge roll arcs away from the ribbon as shown in FIG. 3. In this instance, support assembly 34 comprises support arms 40 and 42 and is designed to rotate about axis of rotation 44, thereby causing support arm 40, and edge roll 28 coupled thereto, to move through arc 46. A spring or deadweight 48, can be coupled to either one of the support arms to apply a pressure against glass ribbon 20 by one of the edge rolls 28. In the embodiment of FIG. 3, the passive bias force is applied by gravity G through deadweight 48.

Preferably, the tension force across the ribbon and/or the pinch force at one or more of the edge rollers may be measured in real time. More precisely, reaction forces in the edge rolls shaft are measured and used as a surrogate measure of the forces in the glass ribbon. In addition, the pinch force that each edge roller applies to the ribbon may also be measured, again in real time.

In broad outline, the tension and pinch forces in the shaft of each edge roll and thus in the glass ribbon can be measured, for example, using a flexing member to which the edge roll is mounted. For example, a suitable measurement arrangement is disclosed in U.S. Patent Application Publication 2010/0300214 filed on 27 May 2009 and described below. The flexing member is designed to undergo small deflections in orthogonal directions, i.e., the tension and pinch directions, when a load having force components in those directions is applied to the roll contact surface by the ribbon. Displacement sensors detect the small deflections of the flexing member, at least one sensor being used for each orthogonal axis along which forces are measured. Measuring the deflections and then correlating them to deflections produced by known loads can measure the orthogonal components of the force applied to the roll.

The flexing member is designed to substantially measure only loads along specified orthogonal axes even though loads may be applied in multiple directions. More particularly, the flexing member is designed so that it has at least one portion that deflects in the direction of interest when a specific load is applied but has near zero deflection along the same direction when transverse loads are applied. A displacement sensor is then located to detect deflections of that portion of the flexing member. In this way, the flexing member/displacement sensor combination measures deflections of the flexing member from loads along the direction of interest, but loads in transverse directions will have only minimal effect on the sensor.

The flexing member is also designed to be stiff enough to not adversely affect (upset) the glass forming process. In particular, it has been found that a flexing member having a high compliance can cause the forming process to become unstable. A stiff flexing member leads to small deflections, but in practice it has been found that accurate force monitoring can still be achieved provided a displacement sensor having a high resolution is used. Examples of suitable high-resolution displacement sensors include inductive sensors, i.e., eddy current sensors, piezoelectric sensors, strain gages, capacitive sensors, and optical sensors. It should be noted that the stiffer the flexing member, the more sensitive the displacement sensor needs to be and vice versa. A force gage such as a load cell could also be used in place of a displacement sensor. It should be noted that the load cell would not provide a direct measurement of force since the load is being shared by each of the webs, so a calibration of the load cell would be necessary.

In one embodiment, the apparatus includes a center beam (support member) surrounded by an outer frame. The center beam is connected to the outer frame by a series of thin webs, and the roller is attached to the center beam. The outer frame is fixed relative to the frame of the glass-making machine while the center beam is allowed to deflect relative to the outer frame due to the flexing of the thin webs.

When an axial load is applied to the roll contact surface via the glass motion, the force is transferred through the webs into the fixed frame. The force causes the webs to deflect like a spring. The apparatus includes a sensor that measures the relative deflection of the center beam with respect to the outer frame. By performing a calibration process whereby a series of known loads are applied and the deflections recorded and by then using interpolation, the load can be calculated for any measured deflection. In the case of thin flat webs, the load versus deflection is linear, which allows for a simple calculation of the load by using the slope of the force versus displacement calibration curve. When a normal load, as opposed to an axial load, is applied to the roll, the force is again transferred through the webs into the fixed frame. In this case, the motion of the center beam is a rotation, rather than a translation. Again, a series of known loads are used to calibrate the rotation and by using interpolation, the normal load can be calculated for any measured rotation. As with an axial load, for thin flat webs, the load versus deflection is linear.

To provide sufficient stiffness, the webs may be made of a material having a high modulus of elasticity, such as a ceramic or a metal such as stainless steel, e.g., 17-4 stainless steel. In addition to a high elastic modulus, the material preferably has a high yield strength to withstand the stresses induced in the webs. An estimate of the number of webs and the material properties appropriate for a specific application can be obtained by, for example, modeling the webs as cantilevers. See, for example, Mechanical Analysis and Design by Arthur H. Burr, Elsevier North Holland, Inc., 1981, page 400. A finite element analysis can also be used for this purpose. In addition to a high elastic modulus and high yield strength, the material needs to be resistant to corrosion at elevated temperatures, such as those associated with glass making equipment, since corrosion of the webs will change their stiffness and thus adversely affect the accuracy of the measurements made by the monitoring apparatus. Again, various ceramics and stainless steel can withstand glass-making temperatures for extended periods of time without substantial deterioration. In one embodiment, the webs and fixed frame can be made from a single block of material, e.g., a single block of stainless steel.

In certain embodiments, measurement of the axial load and the monitoring of the normal load are substantially independent of one another. That is, the cross talk between the two determinations, i.e., the error in either determination as a result of the presence of the other force, is less than 1%. Thus, for example, if the device is calibrated using one of the two forces and then the other force is applied, the change in the measured values should be less than 1%.

Figure 4:
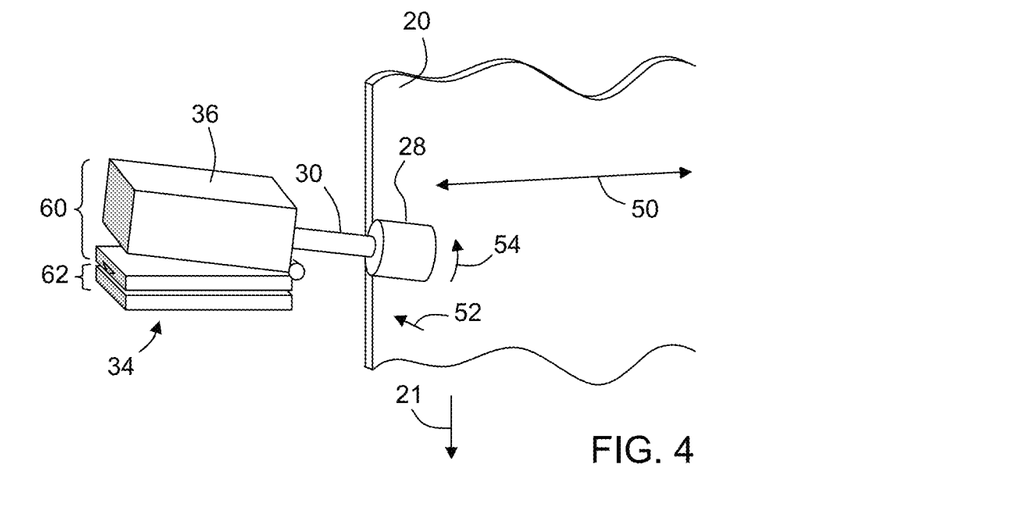
FIG. 4 is a perspective view of an edge roll assembly according to an embodiment of the present invention.

FIGS. 4-13 illustrate an edge roll assembly 26 such as may be used in the embodiment of FIG. 2. The edge roll assembly of FIGS. 4-13 comprises a support assembly 34 and housing 36 suitable for measuring both the tension 50 and pinch force 52 resulting from contact of an edge roll 28 with glass ribbon 20. In FIG. 4, glass ribbon 20 is assumed to be moving downward in direction 21 so that shaft 30 turns counterclockwise as seen from the shaft (see reference number 54). It should be noted that in an opposing assembly (not shown) the shaft turns clockwise.

In overview, support assembly 34 includes a support member 56 (see, for example, FIGS. 5, 6 and 10) that supports shaft 30 of the edge roll. The support member undergoes linear displacement (see 78 in FIG. 10) in response to tension 50 and rotation (see reference number 58 in FIG. 13) in response to pinch force 52. As discussed above, in practice, the linear displacement and rotation are detected and then converted to force values by a calibration procedure in which known loads are applied to the shaft and the resulting linear displacements and rotations are measured.

Figure 5:
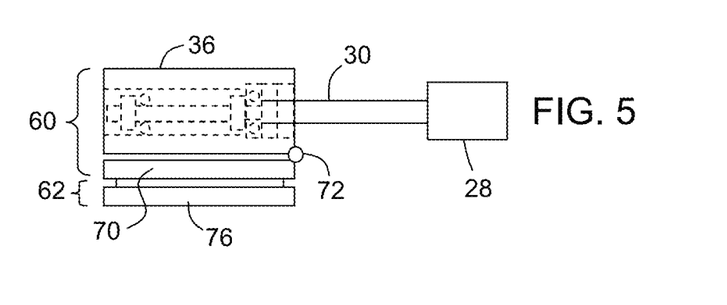
FIG. 5 is a side view of the edge roll assembly of FIG. 4 showing a portion of the interior thereof.
Figure 6:
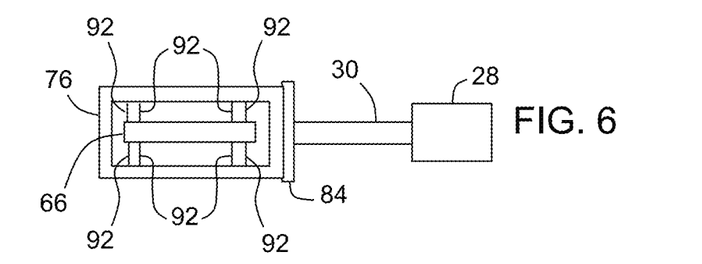
FIG. 6 is a bottom view of a portion of the edge roll assembly of FIG. 4 showing connecting webs for measuring force.
Figure 7:
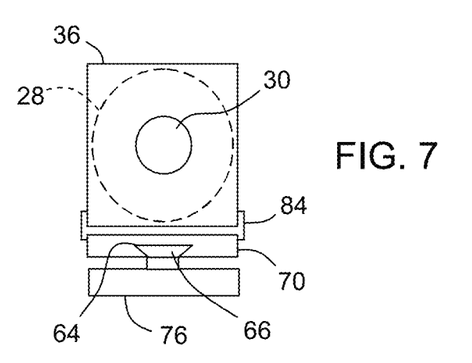
FIG. 7 is an end view of the embodiment of FIG. 4 showing dovetail coupling between upper and lower (frame) support assembly portions.
Figure 8:
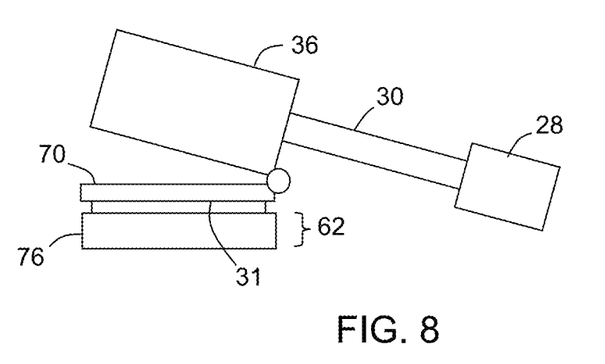
FIG. 8 is a side view of the embodiment of FIG. 4 showing the edge roll housing and shaft in a tilted relationship relative to a horizontal plane.
Figure 9:
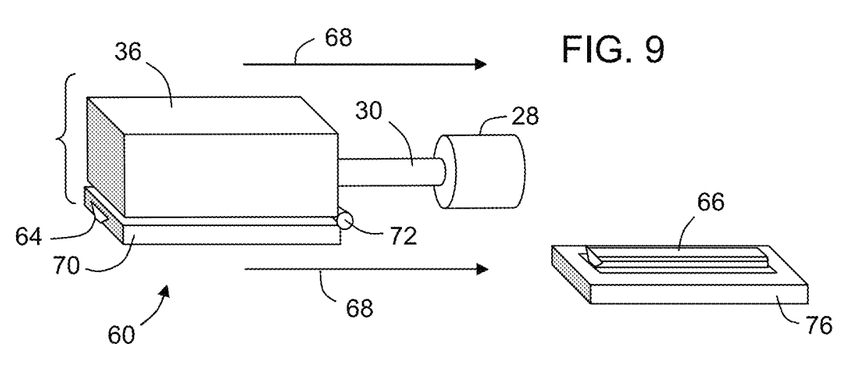
FIG. 9 is a perspective view of the embodiment of FIG. 4 illustrating the coupling between the upper support and the frame.

As shown most clearly in FIGS. 4, 5, and 9, support assembly 34 includes two subassemblies 60 and 62 that in the embodiment shown are separable from one another. Subassembly 60 includes shaft 30 and edge roll 28, while subassembly 62 includes support member 56 and its associated equipment for detecting linear displacements and rotations of the support member. By being separable, an edge roll can be replaced (e.g., as part of regular maintenance), while leaving the roller's support member and its associated equipment in place. As shown most clearly in FIGS. 7 and 9, subassemblies 60 and 62 can be equipped with a female dovetail portion 64 and a male dovetail portion 66, which allows the two subassemblies to be separated and rejoined by a linear motion as illustrated by reference number 68 in FIG. 9. In addition to facilitating assembly and disassembly, a dovetail joint when locked in place by, for example, a moveable gibe (not shown), provides a solid connection between the subassemblies as is desirable for making force measurements. Other types of connections between the subassemblies can, of course, be used in place of a dovetail, e.g., the subassemblies can be bolted together. Also, support assembly 34 can be constructed as a unitary device without subassemblies if desired.

In the embodiment shown, subassembly 60 includes housing 36 and plate 70 which are connected to one another by pivot 72. The pivot allows shaft 30 and edge roll 28 to be oriented at an angle with respect to horizontal as illustrated in FIG. 4, while still leaving plate 70 in a horizontal plane. The particular angle chosen for shaft 30 will depend on the application and the desired amount of tension to be applied to the ribbon by the roller. Rather than using a pivot, shaft 30 and edge roll 28 can be oriented at a fixed angle if desired. As discussed above, shaft 30 and edge roll 28 can be free turning or driven. In the latter case, shaft 30 will be connected to a suitable drive apparatus 74 (FIG. 1).

Figure 10:
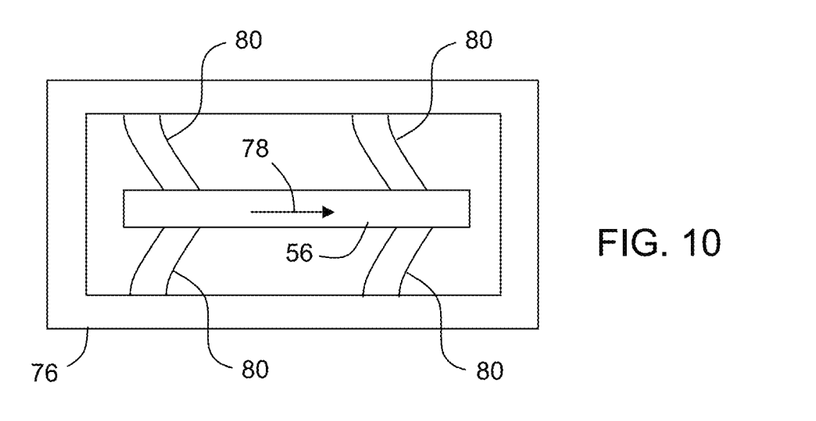
FIG. 10 is a top view of the frame of FIG. 9 showing flexure of the webs.

Subassembly 62 includes support member 56 and frame 76. During use, support member 56 is oriented parallel to the surface of ribbon 20 in a plane perpendicular to the ribbon (i.e., a horizontal plane for a downdraw process) so that the support member is responsive to across-the-ribbon forces applied to shaft 30. In particular, as illustrated in FIG. 10, when a force is applied to shaft 30 which includes a force component in the across-the-ribbon direction, e.g., in the direction of arrow 50 of FIG. 4, support member 56 undergoes a linear displacement in the direction of that force component, as illustrated by arrow 78 in FIG. 10. More particularly, in the embodiment shown, support member 56 undergoes such a linear displacement as a result of elastic deformation of webs 80. For purposes of illustration, only eight webs are shown in FIG. 10 and the magnitude of the webs' deformation has been exaggerated. In practice, more than eight webs could typically be used, e.g., sixteen webs. Importantly, the deformation of webs 80 is frictionless so that the presence of frictional forces does not interfere with the monitoring of the force applied to shaft 30. Although webs are preferred for support member 56, other supports can be used, e.g., springs of various configurations can be employed for this purpose.

Figure 11:
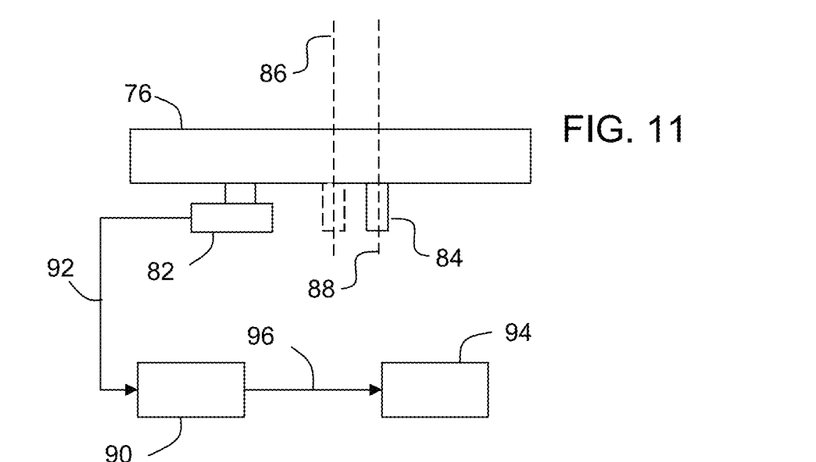
FIG. 11 is a side view of the frame of FIG. 9 showing a sensor and sensor target, an actuator, controller and signal communication lines for moving the shaft of the edge roll relative to the ribbon of glass.

As illustrated in FIG. 11, the displacement of support member 56 is detected using a sensor 82 and a sensor target 84, e.g., an inductive sensor (see above). One member of the sensor/target combination is attached to support member 56 and the other to frame 76. In FIG. 11, it is assumed sensor target 84 is attached to support member 56 and undergoes movement from an initial position 86 to a final position 88. By calibrating this displacement using known forces (see above), the force applied to shaft 30 in the across-the-ribbon direction can be monitored in real time by monitoring the relative movements between the sensor and its target.

In response to displacement of the sensor target, sensor 82 develops a signal that is received by controller 90 through line 92. Controller 90 compares the signal received from sensor 82 and compares the received signal to a predetermined set point. Controller 90 in turn generates a corrective signal that is received by actuator 94 over line 96. Actuator 94 in turn is coupled to shaft 30 so that shaft 30, and thereby tension or pinch force, can be changed in response to the corrective signal. Actuator 94 may be coupled to shaft 30, for example, through frame 76 of support assembly 34, wherein a bearing assembly permits movement of frame 76 in a direction perpendicular to shaft 30. Actuator 94 may comprise, for example, a compressed air or hydraulic cylinder, a linear servomotor or any other suitable actuating apparatus. Actuator 94 may be used alone, wherein actuator 94 supplies the total pinch force, or actuator 94 may be used on combination with a passive force applicator, such as one of the previously mentioned methods of applying a pinch force (e.g. counterweights and/or springs). Controller 90 can be, for example, a general-purpose computer, or any other type of processing unit capable of suitable signal processing.

In response to the corrective signal, actuator 94 is activated to move frame 76 in a direction perpendicular to shaft 30, thereby increasing or decreasing the pinch force as appropriate to maintain pinch force at the predetermined value. For example, if the pinch force increases due to an imperfection in the circularity of a contact surface, sensor 82 develops a force signal that alerts controller 90 to the change in pinch force from a predetermined target pinch force. Controller 90 then develops a corrective signal proportional to the difference between the predetermined target and the force signal that is received by actuator 94. In response to the corrective signal, actuator 94 moves frame 76 away from ribbon 20 in a direction perpendicular to the longitudinal axis of shaft 30, thereby reducing the pinch force. This response can be used, for example, to maintain a constant pinch force.

In some embodiment, the edge rolls on one side of the ribbon can be configured with actuators that that respond to variations in pinch force and/or shaft tension, whereas the opposing edge rolls on the other side of the ribbon are fixed in position.

In other embodiments, controller 90 can be configured to apply a force that provides a total pinch force in accordance with a predetermined schedule or in response to other draw conditions. For example, changes in ribbon temperature could be used by controller 90 to cause a compensating variation in force applied by actuator 94 and thereby varying the total pinch force in response to ribbon temperature changes.

Figure 12:
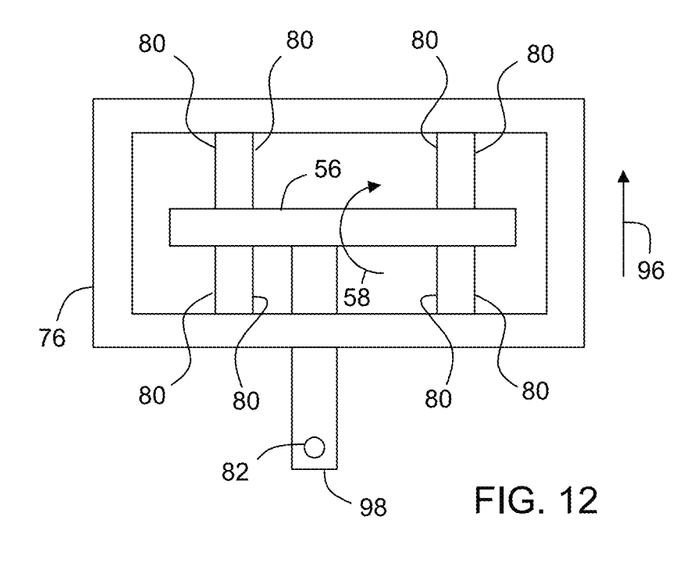
FIG. 12 is a top view of another frame configuration according to another embodiment of the present invention.
Figure 13:
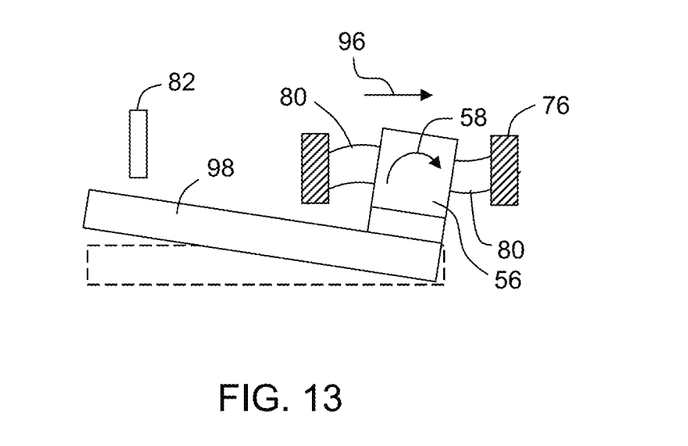
FIG. 13 is a side view of the frame of FIG. 12 showing rotation of the frame.

In addition to across-the-ribbon forces, the movement of support member 56 can also be used to monitor forces applied to shaft 30 which include a component in a direction normal to the ribbon, e.g., in the direction of arrow 52 of FIG. 4. In this case, as illustrated in FIGS. 12 and 13, the motion of support member 56 is a rotation (see reference number 58), as opposed to a linear displacement. In these figures, arrow 96 illustrates the force component normal to the ribbon. As best shown in FIG. 13, force 96 causes webs 80 to elastically deform during the rotation. As with the linear displacement of FIG. 10, other means besides webs can be used to support member 56 so it can undergo rotation in response to a force having a component normal to the surface of the ribbon.

However supported, the rotation of support member 56 is detected using a sensor/target combination. As shown in FIG. 13, sensor 82 can be mounted on frame 76 and a target (not shown) can be mounted on an arm 98 attached to support member 56. The arm serves to amplify the rotation of the support member, thus facilitating detection of the rotation. By calibrating the rotation of arm 98 using known forces (see above), the force applied to shaft 30 in a direction normal to the ribbon can be measured in real time and the magnitude of the force communicated to controller 90. As described above, the controller compares the magnitude of the measured force to a predetermined set point value, and develops a corrective signal if the measured value and the set point value are not equal. The corrective signal is received by actuator 94 that activates and moves the edge roll to vary the pinch force.

It should be noted that as discussed above, the linear displacement of support member 56 in response to a force component in the across-the-ribbon direction is substantially independent of the rotation of the support member in response to a force component normal to the ribbon, thus allowing these force components to be monitored independently of one another. The two components can be monitored simultaneously, sequentially, or periodically, as desired. Also, rather than detecting both linear displacements and rotations, only one of the motions of support member 56 can be detected if only one is of interest for a particular application.

In some applications, it may be desirable to monitor the position of support assembly 34 with respect to ribbon 20. In such a case, a target, e.g., an optical target, can be mounted on the outside surface of the assembly and its position detected as a function of time. As another alternative, a cable transducer can be attached to support assembly 34 and used to monitor any changes in the location of the apparatus, e.g., as a result of wear of edge roll 28 over time.

Figure 14:
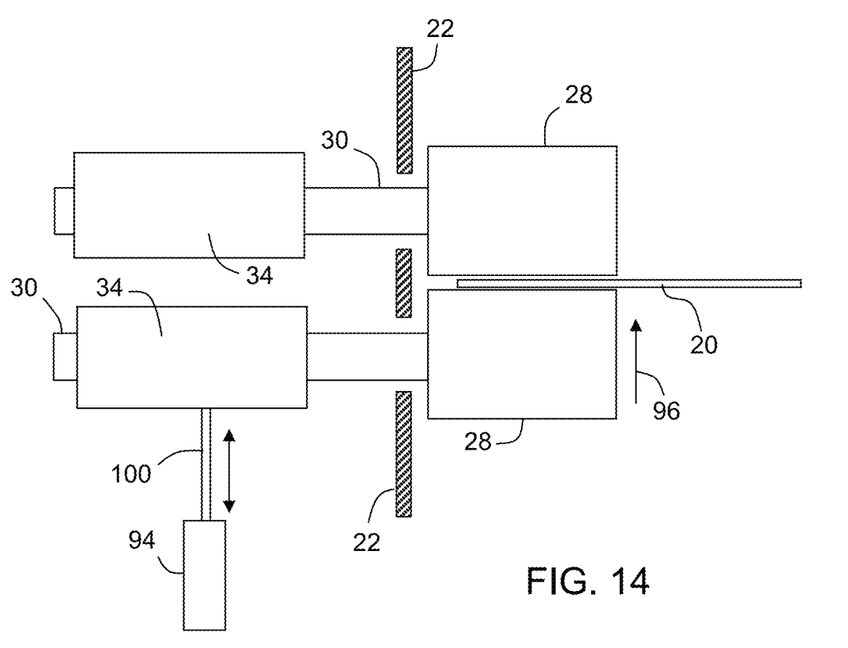
FIG. 14 is an embodiment of the present invention illustrating translational movement of an edge roll shaft in a horizontal plane to adjust pinch force and or tension via an actuator coupled to the shaft.
Figure 15:
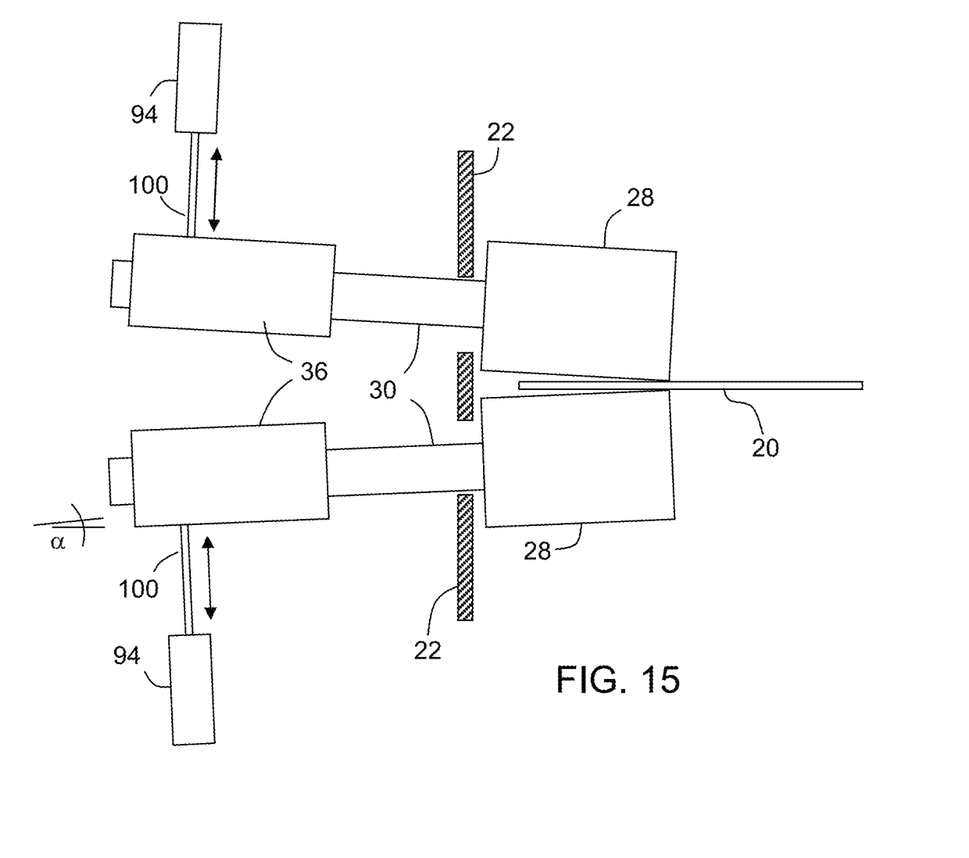
FIG. 15 is an embodiment of the present invention illustrating angular movement of an edge roll shaft in a horizontal plane to adjust pinch force and/or tension via an actuator.
Figure 16:
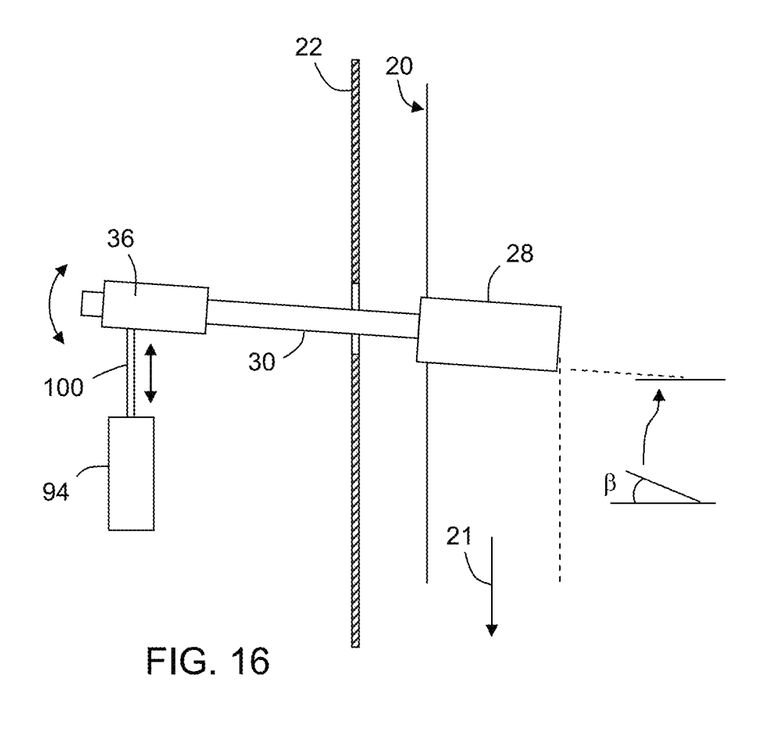
FIG. 16 is an embodiment of the present invention illustrating angular movement of edge roll shafts in a vertical plane.

FIGS. 14-16 provide exemplary, non-limiting views of different configurations in which the previously described embodiments can be configured. Seal plates are not shown for clarity. For example, FIG. 14 illustrates a pair of edge rolls assemblies that are opposing across the thickness of the glass ribbon, and wherein actuator 94 (via linkage member 100) is used to translate one edge roll assembly in a direction perpendicular to the longitudinal axis of shaft 30 (as indicate by arrow 102). (See also FIG. 2)

FIG. 15 depicts a configuration where instead of translating one or both shafts 30 in a direction perpendicular to the shaft(s), actuator 94 is used to vary an angle of the shaft in a horizontal plane. In the embodiment of FIG. 15, both roll shafts of the opposing edge rolls is moved through an angle α in a horizontal plane.

In the embodiment of FIG. 16 (illustrating only a single edge roll of a pair of opposing edge rolls), actuator 94 is used to move edge roll shaft 30 through an angle β in a vertical plane, thereby changing the angle of the shaft relative to an edge of ribbon 20.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for drawing a glass ribbon comprising:
   an edge roll assembly comprising:
      a rotatable shaft;
      an edge roll coupled to the rotatable shaft that contacts an edge of the glass ribbon;
   a support member coupled to the edge roll assembly and a support frame;
   a sensor and a sensor target, the sensor being configured to detect a tension force in an across-the-ribbon direction of the glass ribbon or a pinch force in a thickness direction of the glass ribbon and develop an electrical signal proportional to the tension force or pinch force based on a displacement of the sensor target, wherein the sensor is coupled to at least one of the support frame and the support member and the sensor target is coupled to the other of the support frame and the sensor target;
   a controller configured to receive the sensor signal and develop a corrective signal based on the electrical signal and a set point; and
   an actuator coupled to the rotatable shaft and configured to receive the corrective signal from the controller and vary the tension force or the pinch force in response to the corrective signal such that the applied pinch force or tension force is substantially equal to the set point.

2. The apparatus according to claim 1, wherein the actuator is arranged to move the rotatable shaft in a vertical plane.

3. The apparatus according to claim 1, wherein at least a portion of the pinch force is a passive force.

4. The apparatus according to claim 3, wherein the passive force is applied by a dead weight.

5. The apparatus according to claim 1, wherein the controller is configured such that the tension force applied by the actuator and the edge roll assembly in a lateral direction across the width of the glass ribbon maintains a maximum peak-to-peak variation of less than about 4.5 kg.

6. The apparatus according to claim 1, wherein the controller is configured such that the tension force applied by the actuator and the edge roll assembly in a lateral direction across the width of the glass ribbon maintains a maximum peak-to-peak variation of less than about 3.0 kg.

7. The apparatus according to claim 1, wherein the controller is configured such that the pinch force applied by the actuator and the edge roll assembly in a thickness direction of the glass ribbon maintains a maximum peak-to-peak variation of less than about 4.5 kg.

8. The apparatus according to claim 1, wherein the controller is configured such that the pinch force applied by the actuator and the edge roll assembly in a thickness direction of the glass ribbon maintains a maximum peak-to-peak variation of less than about 3.0 kg.

9. The apparatus according to claim 1, wherein the actuator is configured to move the rotatable shaft in a direction perpendicular to a longitudinal axis of the rotatable shaft in a horizontal plane.

10. An apparatus for drawing a glass ribbon comprising:
    an edge roll assembly comprising:
       a rotatable shaft;
       an edge roll coupled to the rotatable shaft that contacts an edge of the glass ribbon;
    a support member coupled to the edge roll assembly and a support frame;
    a sensor and a sensor target, the sensor being configured to detect a tension force in an across-the-ribbon direction of the glass ribbon or a pinch force in a thickness direction of the glass ribbon and develop an electrical signal proportional to the tension force or pinch force based on a displacement of the sensor target, wherein the sensor is coupled to at least one of the support frame and the support member and the sensor target is coupled to the other of the support frame and the sensor target;
    a controller configured to receive the sensor signal and develop a corrective signal based on the electrical signal and a set point; and
    an actuator coupled to the rotatable shaft and configured to receive the corrective signal from the controller and to actively reposition the edge roll relative to the glass ribbon to vary the tension force or the pinch force in an across-the-ribbon direction of the glass ribbon in response to the corrective signal to maintain a constant tension in the across-the-ribbon-direction of the glass ribbon.

11. The apparatus according to claim 10, wherein the controller is configured such that the tension force applied by the actuator and the edge roll assembly in a lateral direction across the width of the glass ribbon maintains a maximum peak-to-peak variation of less than about 4.5 kg.

12. The apparatus according to claim 10, wherein the controller is configured such that the tension force applied by the actuator and the edge roll assembly in a lateral direction across the width of the glass ribbon maintains a maximum peak-to-peak variation of less than about 3.0 kg.

13. The apparatus according to claim 10, wherein the controller is configured such that the pinch force applied by the actuator and the edge roll assembly in a thickness direction of the glass ribbon maintains a maximum peak-to-peak variation of less than about 4.5 kg.

14. The apparatus according to claim 10, wherein the controller is configured such that the pinch force applied by the actuator and the edge roll assembly in a thickness direction of the glass ribbon maintains a maximum peak-to-peak variation of less than about 3.0 kg.

15. The apparatus according to claim 10, wherein the actuator is configured to move the rotatable shaft in a direction perpendicular to a longitudinal axis of the rotatable shaft in a horizontal plane.

16. The apparatus according to claim 10, wherein the applied pinch force or tension force is substantially equal to the set point.

* * * * *